United States Patent [19]
Bohnett

[11] 4,026,069
[45] May 31, 1977

[54] TURNSTILE ASSEMBLY

[76] Inventor: Floyd Newell Bohnett, P.O. Box 1536, Kailua, Kona, Hawaii 96740

[22] Filed: Mar. 25, 1976

[21] Appl. No.: 670,188

[52] U.S. Cl. .................................. 49/49; 49/237; 49/386; 119/155

[51] Int. Cl.² ........................................ E01F 13/00

[58] Field of Search ............. 49/49, 237, 238, 386; 248/231, 221 F; 119/155

[56] References Cited

UNITED STATES PATENTS

| | | | |
|---|---|---|---|
| 250,424 | 12/1881 | Cobb | 49/238 |
| 428,905 | 5/1890 | Guerra | 49/49 |
| 1,256,688 | 2/1918 | Hall | 248/231 |
| 1,533,921 | 4/1925 | Kennedy | 49/49 |
| 2,628,441 | 2/1953 | Enghauser | 49/237 |
| 2,691,231 | 10/1954 | Cook | 49/49 |
| 2,709,862 | 6/1955 | Leslie, Jr. | 49/49 |
| 3,293,800 | 12/1966 | Martinmaas | 49/386 |
| 3,803,763 | 4/1974 | Reed et al. | 49/49 |

*Primary Examiner*—Peter M. Caun
*Attorney, Agent, or Firm*—Harry W. Brelsford

[57] ABSTRACT

A U-shaped frame is secured to a pair of spaced fence posts, and the frame has yoke members which secure the U-frame at the top and the bottom to the fence posts. A one-way gate or turnstile is provided by rotatable members on the U-frame having turnstile arms. A means of removably securing the U-frame to the fence posts is in the form of members securing the fence posts which can be manually tightened. The entire turnstile is designed to be readily removable from the fence line or readily insertable in a fence line; if the fence posts to which it is attached are weak, the U-frame tends to strengthen them.

3 Claims, 4 Drawing Figures

TURNSTILE ASSEMBLY

This invention relates to turnstile for livestock and has particular reference to a prefabricated turnstile that can be located at any desired point in a fence line to control movement of livestock from one fenced field to another.

Gates have long been used as a means for creating an opening in a fence line so that livestock can be driven from one field to another as feed and treatment schedules demand. They are disadvantageous, however, in requiring a person to open the gate for the passage of livestock and then close it. This reduces the manpower available during the time of opening and closing the gate. More seriously, however, is the structural problem. Gates are usually heavy in construction and require farily massive fence posts to support them. For this reason, they are not economical to use, as changing conditions dictate the need for gates at different locations.

I have devised a turnstile that can easily replace gates for livestock control. No loss of personnel time is required to open or close the turnstile as it is always in a condition for operation. Further, no massive fence posts are required to support my turnstile as it is a self-contained assembly and requires only two light-duty fence posts to support it. It can be quickly and inexpensively inserted in fence line by erecting these two spaced fence posts, cutting the fence wire between them, and connecting each end of the wire to these two posts. My assembly is then connected to the two fence posts by self-contained fasteners.

In summary, I provide a U-shaped frame that supports one or two rotatable turnstile shafts having one or more aligned stile arms projecting from the shafts. The livestock press against the arms, which yield under spring pressure in one directly only, and after the livestock have passed through the spring returns the shaft and arm to the starting position. The livestock cannot return through the turnstile because of the one-way construction. The two upright stems of the U-shape carry V-shaped notches that engage the two fence posts, and suitable fasteners are manually tightened to pull the U-frame to the posts. I presently prefer a chain or cable that passes around the posts, preferably at the top and bottom of each stem of the U-shape.

Various objects, advantages, and features of the invention will be apparent in the following description and claims, considered together with the accompanying drawings forming an integral part of this specification, in which:

Figures 1, 2, 3, 4:
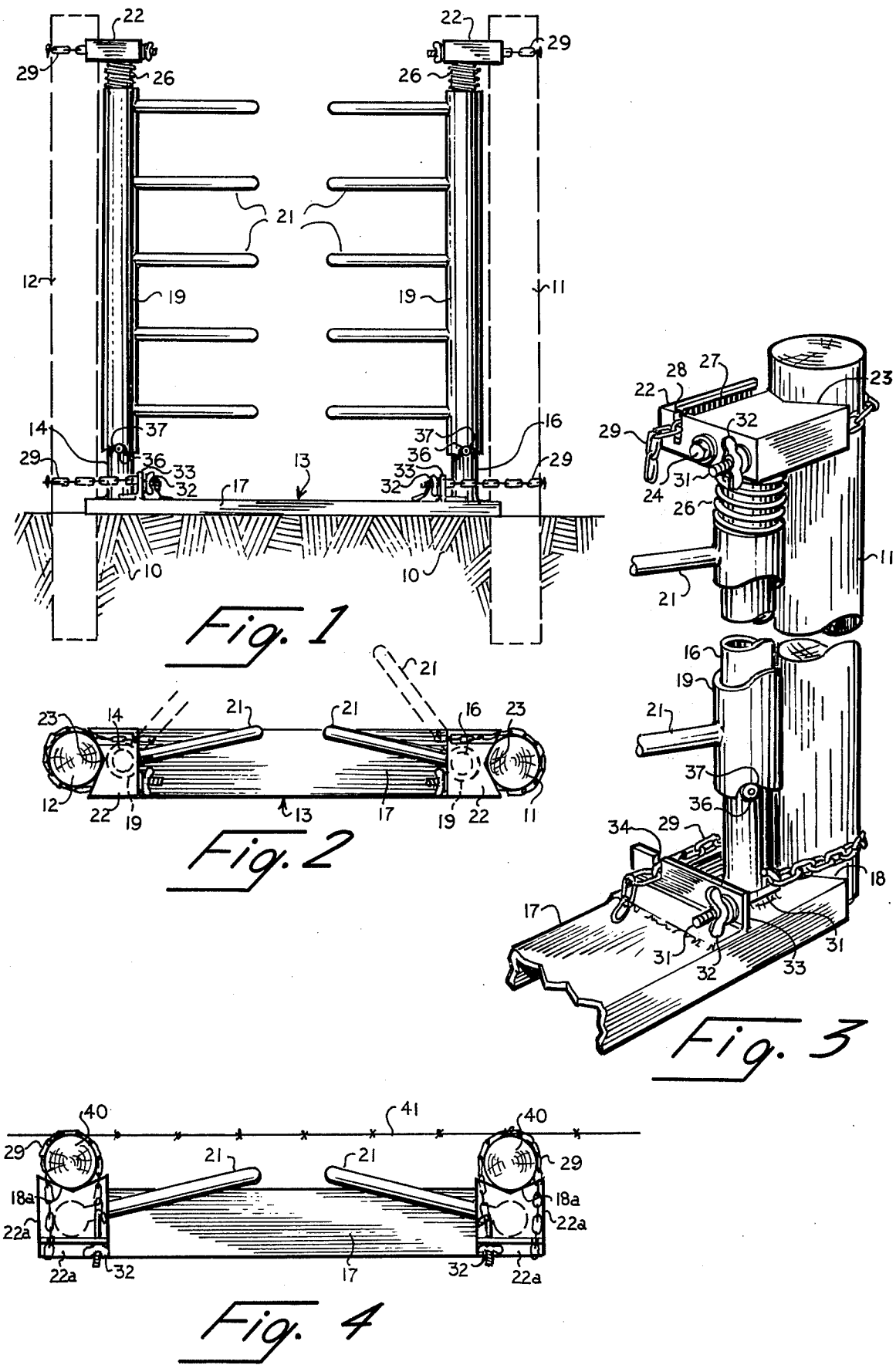
FIG. 1 is an elevation view of a pair of fence posts between which the assembly of the invention is inserted.
FIG. 2 is a top view of the structure of FIG. 1.
FIG. 3 is a fragmentary three-dimensional view of the device of FIG. 1, showing one of the vertical frame members and the fence posts to which it is secured.
FIG. 4 is a top view of a modified form of the invention.

Referring now to FIGS. 1, 2, and 3, inserted in the ground 10 is a pair of fence posts 11 and 12, having disposed between them a U-shaped frame 13 having a pair of upright stems 14 and 16 and a generally horizontal cross member 17 resting on the ground 10 and joining the upright stems 14 and 16 mechanically together. It will be noted particularly with respect to FIG. 3 that the horizontal cross member 17 may be in the form of a channel having a V-shaped notch 18 on each end and the posts 11 and 12 fit closely against this V-shaped notch. The posts 11 and 12 are carefully spaced by a measured distance to fit within these notches 18 at the end of the cross member 17; or, alternatively, if the fence posts' spacing is known; then the length of the cross member 17 can be manufactured to fit this spacing very precisely.

Referring still to FIGS. 1, 2, and 3, the uprights 14 and 16 of the U-shape are preferably round in cross section so that a rotatable tubular shaft 19 may be fitted over each upright and each rotatable shaft 19 may have generally horizontal arms 21 secured thereto to act as turnstile arms. Secured to the top of each upright 14 and 16 are identical upper yokes 22, each having a V-shaped notch 23 therein to fit against the fence posts 11 and 12. These upper yokes 22 may be secured to the uprights by a bolt 24 (FIG. 3) or other suitable fastener. Disposed between the upper yokes 22 and the top of the rotatable shafts 19 are compression springs 26, and these may also be torsion springs, if desired, to restore the shafts 19 and arms 21 to the rest position shown in FIG. 2.

Referring now especially to the upper part of FIG. 3, it will be noted that the upper yokes 22 are in the shape of four sides of a box and have a slit 27 cut into each top surface. The slit is continued into a vertical surface of the yokes 22, but is narrower at 28 so that individual links of a chain 29 are caught therein. Welded or otherwise secured to the other end of the chain is a threaded stud 31 (lower part of FIG. 3 also), which projects through a hole in the yoke 22 to be engaged by a wing nut 32. By means of this structure, the wing nut 32 may be manually tightened to pull the posts 11 and 12 tightly into the V-shaped notch 23 of each top yoke 22.

Referring now to FIGS. 1 and 3, the same chain construction is used to secure the horizontal member 17 to the posts 11 and 12. Secured to the top of the member 17, as by welding, are angle iorns 33, each having a chain slot 34. The chain is tightened around the post by the wing nuts 32.

The angular disposition of the turnstile arms in their rest position as presently preferred is shown in FIG. 2. This permits cattle or other livestock to easily move the arms to the open position shown in broken outline. If the livestock attempt to move from up to down as shown in FIG. 2, they will be pinched by the ends of the arms 21 and will desist from reverse entry through the turnstile.

This rest position of FIG. 2 can be accomplished by any desired mechanism. I presently prefer ball-bearing rollers 36 fitting within a scallop 37 in the bottom of each rotatable shaft 19. Suitable contouring of other parts of the bottom end of the shafts 19 will cause the shafts to return to the rest position even if spring 26 acts in compression only.

Referring now to FIG. 4, there is illustrated a modification wherein yokes 22a are disposed at right angles to the horizontal base member 17 of the U-frame. These yokes 22a engage fence posts 40, having barbed wire 41 strung between them. Chains 29 encircle the posts and are pulled tight by wing nut 32 to pull the posts 40 into V-shaped notches 18a of the yokes 22a. Once the posts are thus secured, the barbed wire 41 may be cut and wrapped around the posts 40 to secure it to the posts. In this fashion, the assembly of FIG. 4 can be inserted in any fence line. The construction of the assembly of FIG. 4 can otherwise be similar to that of FIGS. 1, 2, and 3, including turnstile arms 321.

Referring now to the operation of the assembly of FIS. 1, 2, and 3, after it is installed between the fence posts 11 and 12, cattle or other livestock press against the turnstile arms 21, which as viewed in FIG. 2 would be in an upward direction. The arms rotate to the position of the broken outline 21, made possible by the rotation of the shafts 19. The coil springs 26, acting in conjunction with detent rollers 36, return the arms to the rest position shown in FIG. 2. Cattle are prevented from returning by the pinching action of the ends of the arms 21 as they move in a downward direction as viewed in FIG. 2, plus the resistance in torque of the springs 26.

The assembly of FIGS. 1, 2, and 3 is inserted between the carefully spaced fence posts 11 and 12 and the chains 29 are wrapped around each post top and bottom. A link of each top chain is manually caught in the slots 28 of the upper yokes 22 and in the slots 34 of the lower angle irons 33. The chains 29 are tightened by manually rotating wing nuts 32 on their threaded studs 31 connected to the other end of the chains 29. Removal of the assembly is made by loosening the chains 29, unlatching the lines from their respective slots 22 or 34, removing the chains 29, and lifting the assembly vertically.

The mode of attachment of the modification of FIG. 4 has previously been described.

While the invention has been described with respect to specific embodiments, it is not limited to these embodiments, which are merely illustrative. The following claims include within their scope all variations and modifications that fall within the true spirit and scope of the invention.

I claim:
1. A prefabricated and portable turnstile assembly for livestock that can be inserted in a fence line having two spaced fence posts comprising:
   a. a U-shaped frame having vertical stems and a generally horizontal lower cross member joining the stems, said horizontal cross member being of a length to dispose each vertical stem adjacent to one of said two spaced fence posts;
   b. yokes disposed one adjacent to the top and one adjacent to the bottom of each vertical stem to engage the adjacent fence post;
   c. fasteners on each U-stem for engaging said adjacent fence post and for pulling the fence post against the yoke to thereby secure the U-frame to the two fence posts;
   d. at least one generally vertical rotatable tubular shaft fitting over at least one of the stems of the U-shape and supported on the U-frame;
   e. at least one arm projecting from said rotatable shaft;
   f. and means for normally biasing the shaft to dispose the arm across the space between the two stems of the U-shape, to give rise to a turnstile action.

2. A turnstile as set forth in claim 1 wherein the yoke is a horizontal projection having a V-shaped notch therein.

3. A turnstile as set forth in claim 1 wherein each yoke projection is substantially at right angles to the horizontal cross member of the U-shape so that the turnstile will be at one side of the fence posts for ease in cutting any fence wires and connecting the wires to the fence posts.

* * * * *